US008972585B2

(12) United States Patent
Hopkins

(10) Patent No.: US 8,972,585 B2
(45) Date of Patent: Mar. 3, 2015

(54) METHOD FOR SPLITTING A LOAD OF MONITORING A PEER TO PEER NETWORK

(75) Inventor: Samuel P. Hopkins, Freedom, PA (US)

(73) Assignee: Tiversa IP, Inc., Pittsburgh, PA (US)

( * ) Notice: Subject to any disclaimer, the term of this patent is extended or adjusted under 35 U.S.C. 154(b) by 0 days.

(21) Appl. No.: 12/899,053

(22) Filed: Oct. 6, 2010

(65) Prior Publication Data

US 2011/0066695 A1    Mar. 17, 2011

Related U.S. Application Data

(60) Division of application No. 11/039,981, filed on Jan. 21, 2005, now Pat. No. 8,095,614, which is a continuation-in-part of application No. 10/764,111, filed on Jan. 23, 2004, now Pat. No. 7,761,569.

(51) Int. Cl.
*G06F 15/173*    (2006.01)
*G06F 15/16*    (2006.01)
(Continued)

(52) U.S. Cl.
CPC .......... *H04L 41/0816* (2013.01); *H04L 67/145* (2013.01); *H04L 12/2697* (2013.01); *H04L 43/50* (2013.01); *H04L 67/104* (2013.01); *H04L 67/1063* (2013.01); *H04L 67/1093* (2013.01); *H04L 67/107* (2013.01); *Y10S 707/99956* (2013.01); *H04L 12/241* (2013.01); *H04N 21/632* (2013.01)
USPC .......... 709/227; 709/225; 709/226; 370/236; 370/386; 707/999.205

(58) Field of Classification Search
USPC .......... 709/204, 223, 225, 227, 238; 370/236, 370/386
See application file for complete search history.

(56) References Cited

U.S. PATENT DOCUMENTS

| 111,604 A | 2/1871 | Bailey |
| 5,949,760 A | 9/1999 | Stevens et al. |

(Continued)

FOREIGN PATENT DOCUMENTS

| CN | 1466068 A | 1/2004 |
| CN | 101606143 | 12/2009 |

(Continued)

OTHER PUBLICATIONS

Phemus, "Secret Manual for Downloading: Final Second Part of Answers to Questions for Downloading", PC Japan, vol. 5, 11, pp. 174-179, Nov. 1, 2000.

(Continued)

*Primary Examiner* — Shirley Zhang
(74) *Attorney, Agent, or Firm* — Cesari and McKenna, LLP

(57) ABSTRACT

In accordance with an embodiment of the invention, there is provided a method for splitting a load of monitoring a peer to peer network. The method has a first node in the peer to peer network receiving information reported by a second node in the peer to peer network, including information concerning which nodes are connected to the second node. The method further has the first node connecting to nodes different from the nodes that are connected to the second node using the received information. The method still further has the first node reporting information, including information concerning which nodes are connected to the first node, such that the second node also has access to the reported information, thereby splitting the load of monitoring the peer to peer network among the first and second nodes.

18 Claims, 5 Drawing Sheets

(51) Int. Cl.
  *H04L 12/26* (2006.01)
  *H04L 12/50* (2006.01)
  *H04L 12/24* (2006.01)
  *H04L 29/08* (2006.01)
  *H04N 21/63* (2011.01)

(56) References Cited

U.S. PATENT DOCUMENTS

| | | | |
|---|---|---|---|
| 5,987,011 A | 11/1999 | Toh | |
| 6,069,896 A | 5/2000 | Borgstahl et al. | |
| 6,076,088 A | 6/2000 | Paik et al. | |
| 6,205,146 B1 | 3/2001 | Rochberger et al. | |
| 6,611,196 B2 | 8/2003 | Mynatt et al. | |
| 6,668,289 B2 | 12/2003 | Cheng et al. | |
| 6,732,180 B1 | 5/2004 | Hale et al. | |
| 6,839,769 B2 | 1/2005 | Needham et al. | |
| 6,855,660 B2 | 2/2005 | Tsou et al. | |
| 6,918,113 B2 | 7/2005 | Patel et al. | |
| 6,950,821 B2 | 9/2005 | Faybishenko et al. | |
| 6,965,591 B1 | 11/2005 | Roy | |
| 6,983,320 B1 | 1/2006 | Thomas et al. | |
| 7,003,514 B2 | 2/2006 | Dutta et al. | |
| 7,010,534 B2 | 3/2006 | Kraft | |
| 7,027,994 B2 | 4/2006 | Verdi et al. | |
| 7,035,653 B2 | 4/2006 | Simon et al. | |
| 7,089,301 B1 | 8/2006 | Labio et al. | |
| 7,120,145 B2 | 10/2006 | Ohba et al. | |
| 7,120,619 B2 | 10/2006 | Drucker et al. | |
| 7,174,382 B2 | 2/2007 | Ramanathan et al. | |
| 7,177,295 B1 | 2/2007 | Sholander et al. | |
| 7,206,841 B2 | 4/2007 | Traversat et al. | |
| 7,308,445 B2 | 12/2007 | Bharat et al. | |
| 7,318,092 B2 | 1/2008 | Sutler | |
| 7,327,683 B2* | 2/2008 | Ogier et al. | 370/236 |
| 7,418,455 B2 | 8/2008 | Fan et al. | |
| 7,441,180 B1 | 10/2008 | Kaczmarek et al. | |
| 7,533,168 B1* | 5/2009 | Pabla et al. | 709/224 |
| 7,574,523 B2* | 8/2009 | Traversat et al. | 709/238 |
| 7,600,033 B2 | 10/2009 | Bauer et al. | |
| 7,703,040 B2 | 4/2010 | Cutrell et al. | |
| 7,941,482 B2* | 5/2011 | Bates et al. | 709/203 |
| 2001/0003191 A1 | 6/2001 | Kovacs et al. | |
| 2001/0037325 A1 | 11/2001 | Bidernman et al. | |
| 2001/0045949 A1 | 11/2001 | Chithambaram et al. | |
| 2002/0016786 A1 | 2/2002 | Pitkow et al. | |
| 2002/0044549 A1 | 4/2002 | Johansson et al. | |
| 2002/0059204 A1 | 5/2002 | Harris | |
| 2002/0065832 A1 | 5/2002 | Mack | |
| 2002/0069098 A1 | 6/2002 | Schmidt | |
| 2002/0073204 A1 | 6/2002 | Dutta et al. | |
| 2002/0087885 A1 | 7/2002 | Peled et al. | |
| 2002/0103893 A1* | 8/2002 | Frelechoux et al. | 709/223 |
| 2002/0129140 A1 | 9/2002 | Peled et al. | |
| 2002/0138471 A1 | 9/2002 | Dutta et al. | |
| 2002/0143989 A1 | 10/2002 | Huitema et al. | |
| 2002/0152262 A1 | 10/2002 | Arkin et al. | |
| 2002/0161844 A1 | 10/2002 | Overtoom | |
| 2002/0181395 A1 | 12/2002 | Foster et al. | |
| 2002/0184310 A1 | 12/2002 | Traversat et al. | |
| 2002/0188735 A1 | 12/2002 | Needham et al. | |
| 2003/0005035 A1 | 1/2003 | Rodgers | |
| 2003/0037167 A1 | 2/2003 | Garcia-Luna-Aceves et al. | |
| 2003/0050966 A1 | 3/2003 | Dutta et al. | |
| 2003/0050980 A1 | 3/2003 | Dutta et al. | |
| 2003/0055892 A1 | 3/2003 | Huitema et al. | |
| 2003/0078889 A1 | 4/2003 | Lee et al. | |
| 2003/0088544 A1 | 5/2003 | Kan et al. | |
| 2003/0095660 A1 | 5/2003 | Lee et al. | |
| 2003/0112823 A1 | 6/2003 | Collins et al. | |
| 2003/0126136 A1 | 7/2003 | Omoigui | |
| 2003/0126199 A1 | 7/2003 | Kadri et al. | |
| 2003/0135495 A1 | 7/2003 | Vagnozzi | |
| 2003/0145093 A1 | 7/2003 | Oren et al. | |
| 2003/0182428 A1 | 9/2003 | Li et al. | |
| 2003/0191828 A1 | 10/2003 | Ramanathan et al. | |
| 2003/0195852 A1 | 10/2003 | Campbell et al. | |
| 2003/0202468 A1 | 10/2003 | Cain et al. | |
| 2003/0208621 A1 | 11/2003 | Bowman | |
| 2003/0212710 A1 | 11/2003 | Guy | |
| 2004/0019650 A1 | 1/2004 | Auvenshine | |
| 2004/0030651 A1 | 2/2004 | Kim et al. | |
| 2004/0034652 A1 | 2/2004 | Hoffman et al. | |
| 2004/0039921 A1 | 2/2004 | Chuang | |
| 2004/0044790 A1 | 3/2004 | Loach et al. | |
| 2004/0044996 A1 | 3/2004 | Atallah | |
| 2004/0098370 A1 | 5/2004 | Garland et al. | |
| 2004/0103297 A1 | 5/2004 | Risan et al. | |
| 2004/0111604 A1 | 6/2004 | Fournier | |
| 2004/0122958 A1 | 6/2004 | Wardrop | |
| 2004/0133571 A1 | 7/2004 | Horne et al. | |
| 2004/0139211 A1 | 7/2004 | Baker et al. | |
| 2004/0143842 A1 | 7/2004 | Joshi | |
| 2004/0148275 A1 | 7/2004 | Achlioptas | |
| 2004/0148434 A1 | 7/2004 | Matsubara et al. | |
| 2004/0153472 A1 | 8/2004 | Rieffanaugh | |
| 2004/0153658 A1 | 8/2004 | Gunyakti et al. | |
| 2004/0157641 A1 | 8/2004 | Chithambaram et al. | |
| 2004/0158630 A1 | 8/2004 | Chang et al. | |
| 2004/0196784 A1 | 10/2004 | Larsson et al. | |
| 2004/0218532 A1 | 11/2004 | Khirman | |
| 2004/0220926 A1 | 11/2004 | Lamkin et al. | |
| 2004/0230572 A1 | 11/2004 | Omoigui | |
| 2004/0236945 A1 | 11/2004 | Risan et al. | |
| 2004/0250106 A1 | 12/2004 | Annese et al. | |
| 2004/0250122 A1 | 12/2004 | Newton | |
| 2004/0260761 A1 | 12/2004 | Leaute et al. | |
| 2004/0260801 A1 | 12/2004 | Li | |
| 2005/0028012 A1 | 2/2005 | Amamiya et al. | |
| 2005/0038898 A1 | 2/2005 | Mittig et al. | |
| 2005/0043548 A1 | 2/2005 | Cates | |
| 2005/0060297 A1 | 3/2005 | Najork | |
| 2005/0060406 A1* | 3/2005 | Zhang et al. | 709/225 |
| 2005/0080858 A1 | 4/2005 | Pessach | |
| 2005/0080883 A1* | 4/2005 | Nurminen et al. | 709/221 |
| 2005/0091167 A1 | 4/2005 | Moore et al. | |
| 2005/0091202 A1 | 4/2005 | Thomas | |
| 2005/0091397 A1 | 4/2005 | Roberts et al. | |
| 2005/0108203 A1 | 5/2005 | Tang et al. | |
| 2005/0108248 A1 | 5/2005 | Natunen | |
| 2005/0114709 A1 | 5/2005 | Moore | |
| 2005/0119998 A1 | 6/2005 | Greco et al. | |
| 2005/0125374 A1 | 6/2005 | Curtis et al. | |
| 2005/0125673 A1 | 6/2005 | Cheng et al. | |
| 2005/0144288 A1 | 6/2005 | Liao | |
| 2005/0163050 A1 | 7/2005 | Hopkins | |
| 2005/0163133 A1 | 7/2005 | Hopkins | |
| 2005/0163135 A1 | 7/2005 | Hopkins | |
| 2005/0187942 A1 | 8/2005 | Dutta et al. | |
| 2005/0203851 A1 | 9/2005 | King et al. | |
| 2005/0203892 A1 | 9/2005 | Wesley et al. | |
| 2005/0229243 A1 | 10/2005 | Svendsen et al. | |
| 2005/0229255 A1 | 10/2005 | Gula et al. | |
| 2005/0265259 A1 | 12/2005 | Thubert et al. | |
| 2005/0267945 A1 | 12/2005 | Cohen et al. | |
| 2006/0020814 A1 | 1/2006 | Lieblich et al. | |
| 2006/0029093 A1 | 2/2006 | Van Rossum | |
| 2006/0034177 A1 | 2/2006 | Schrempp | |
| 2006/0039297 A1 | 2/2006 | McNab | |
| 2006/0117372 A1 | 6/2006 | Hopkins | |
| 2006/0136837 A1 | 6/2006 | Ben-Shachar et al. | |
| 2006/0209819 A1 | 9/2006 | Jennings et al. | |
| 2006/0248062 A1 | 11/2006 | Libes et al. | |
| 2007/0124721 A1 | 5/2007 | Cowing et al. | |
| 2007/0162463 A1 | 7/2007 | Kester et al. | |
| 2008/0140780 A1 | 6/2008 | Hopkins | |
| 2008/0263013 A1 | 10/2008 | Hopkins | |
| 2009/0024618 A1 | 1/2009 | Fan et al. | |

FOREIGN PATENT DOCUMENTS

| | | |
|---|---|---|
| EP | 1107512 A1 | 6/2001 |
| EP | 2082326 | 7/2009 |
| JP | 2010-509674 | 3/2010 |
| WO | WO 03/009524 | 1/2003 |

(56) References Cited

FOREIGN PATENT DOCUMENTS

| WO | WO 2005/074230 A2 | 8/2005 |
| WO | WO2006/110823 A3 | 10/2006 |
| WO | WO 2006/124027 A1 | 11/2006 |
| WO | WO2008/057509 A3 | 5/2008 |
| WO | WO2008/127608 A3 | 10/2008 |

OTHER PUBLICATIONS

Hessing, Steven, "Peer to Peer Messaging Protocol," Internet-Draft, Apr. 2002, pp. 1-57.
Lindemann, C., et al., "A Distributed Search Service for Peer-to-Peer File Sharing in Mobile Applications," *Peer-to-Peer Computing, 2002, Proceedings of the Second International Conference on Peer-to-Peer Computing,* Sep. 5-7, 2002.
Mondal, A., et al., "Effective load-balancing of peer-to-peer systems," Online, Mar. 2002, XP002299388.
Oram, A., "Peer-to-Peer: Harnessing the Power of Disruptive Technologies," Ch.10 Interoperability Through Gateways, Mar. 2001, p. 381-392.
Shi, W., et al., "Tuxedo: A Peer-to-Peer Caching System," Department of Computer Science, Wayne University.
Zhenyun Zhuang, et al. "Hybrid Periodical Flooding in Unstructured Peer-to-Peer Networks," Proceedings of the 2003 International Conference on Parallel Proceeding.
Zhu, et al., "SDQE: Towards Automatic Semantic Query Optimization in P2P Systems," *Information Processing & Management*, 42(1), pp. 222-236 Oct. 26, 2004.
Hwang, J., and Aravamudham, P., "Proxy-Based Middleware Services for Peer-to-Peer Computing in Virtually Clustered Wireless Grid Networks," School of Information Studies, Syracuse University, CST 4-291.
United States House of Representatives Committee on Government Reform-Staff Report Prepard for Rep. Tom Davis and Rep. Henry A. Waxman, "File-Sharing Programs and Peer-to-Peer Networks Provacy and Security Risk," May 13, 2003, pp. 1-12.
Couch, William, "Peer-To-Peer File-Sharing Networks: Security Risk," SANS Institute InfoSec Reading Room, 2002, pp. 1-11.
Davidson, Alan, "Peer-To-Peer File Sharing Privacy and Security," Center for Democracy and Technology, May 15, 2003, pp. 1-16.
AA-2002.02—File Sharing Activity Part 1 of 2—Security Implications of Using Peer-to-Peer File Sharing Software, May 12, 2002, pp. 1-5.
International Search Report and Written Opinion of the ISA mailed May 14, 2008 in connection with PCT Application No. PCT/US07/23321.
International Search Report and Written Opinion of the ISA mailed Feb. 26, 2009 in connection with PCT Application No. PCT/US08/004614.
International Search Report and Written Opinion of the ISA mailed Sep. 12, 2007 in connection with PCT Application No. PCT/US06/13666.
United States General Accounting Office, Report to the Chairman and Ranking Minority Member, Committee on Government Reform, House of Representatives, "File Sharing Programs—Peer-To-Peer Networks Provide Ready Accessto Child Pornography," Feb. 2003, pp. 1-32.
Andersen, S., et al., Changes to Functionality in Microsoft Windows XP Service Pack 2 Part 2: Network Protection Technologies, Online, Sep. 15, 2004, pp. 1-56, XP002330123.
Brandon Wiley, Freenet, "Inoperability Through Gateways," Chapter 19, pp. 381-392.
Findeli, M., "Peer-to-Peer (P2P) Networkgin," On Line, Jul. 1, 2001, pp. 1-21.
Goel, S., et al., "A Resilient Network That Can Operate Under Duress: To Support Communication Between Government Agencies during Crisis Situations," IEEE, Proceedings of the $37^{th}$ Annual Hawaii International Conference pp. 1-11, Jan. 2004.
Kim, K., and Park , D., "Subway: Peer-to-Peer Clustering of Clients for Web Proxy," Department of Electrical Engineering and Computer Science, [on line, Retrieved on Sep. 25, 2007]. Retrieved from the Internet URL:http://66.102.1.104/scholar?hl=en&lr=&q=cache:Cljbt8-S9ckJ:ideal.cecs.missouri.edu/IMC/papers/377PD . . .
Liu, Jiangchuan, et al., "Distributed Distance Measurement for Large-Scale Networks," Computer Networks 41 (2003) pp. 177-192.
Marmor, Michael S., "Make the P2P Lead with Toadnode," www.webtecniques.com, Dec. 2000, pp. 44-49.
Markatos, E.P., Tracing a large-scale peer to peer system: an hour in the life of Gnutella, Cluster Computing and the Grid $2^{nd}$ IEEE/ACM International Symposium CCGRID, 2002 Berlin, Germany, May 21-24, 2002, IEEE Comput. Soc., US, pp. 65-74.
Scarlata, V., et al., "Responder Anonymity and Anonymous Peer-to-Peer File Sharing," Proceedings of the International Conference on Network Protocols, Nov. 11, 2001, pp. 272-280.
Siu Man Lui, et al., "Interoperability of Peer-To-Peer File Sharing," ACM SIGecom Exchanges, vol. 3, No. 3, Aug. 2002, pp. 25-33.
*Tiversa, Inc., et al v. Cohen & Grigsby, P.C.*, Civil Division, Case No. GD 07/001515, Court of Common Pleas of Allegheny County, Pennsylvania, "Complaint," 89 pages, dated Sep. 5, 2007.
*Tiversa, Inc., et al v. Cohen & Grigsby, P.C.*, Court of Common Pleas of Allegheny County, Pennsylvania, "Preliminary Objections and Brief in Support of Preliminary Objections," 18 pages, dated Oct. 15, 2007.
*Tiversa, Inc., et al v. Cohen & Grigsby, P.C.*, Court of Common Pleas of Allegheny County, Pennsylvania, "First Amended Complaint," 90 pages, dated Nov. 5, 2007.
*Tiversa, Inc., et al v. Cohen & Grigsby, P.C.*, Civil Division, Case No. GD 07/001515, Court of Common Pleas of Allegheny County, Pennsylvania, "Defendant's Preliminary Objections to First Amended Complaint and Brief in Support," 14 pages, dated Nov. 21, 2007.
*Tiversa, Inc., et al v. Cohen & Grigsby, P.C.*, Civil Division, Case No. GD 07/001515, Court of Common Pleas of Allegheny County, Pennsylvania, "Court Order re: Defendant's Preliminary Objections to First Amended Complaint and Brief in Support," 14 pages, dated Nov. 27, 2007.
*Tiversa, Inc., et al v. Cohen & Grigsby, P.C.*, Civil Division, Case No. GD 07/001515, Court of Common Pleas of Allegheny County, Pennsylvania, "Second Amended Complaint," 89 pages, dated Dec. 11, 2007.
*Tiversa, Inc., et al v. Cohen & Grigsby, P.C.*, Civil Division, Case No. GD 07/001515, Court of Common Pleas of Allegheny County, Pennsylvania, "Answer to Second Amended Complaint," 29 pages, dated Jan. 30, 2008.
*Tiversa, Inc., et al v. Cohen & Grigsby, P.C.*, Civil Division, Case No. GD 07/001515, Court of Common Pleas of Allegheny County, Pennsylvania, "Reply to New Matter," 16 pages, dated Feb. 19, 2008.
Ueda, et al., "Peer-to-Peer Network Topology Control within a Mobile Ad-hoc Network," 2003 IEEE, pp. 243-247.
Xiao, et al., "Mutual Anonymity Protocols for Hybrid Peer-to-Peer Systems," Proceedings of the $23^{rd}$ International Conference on Distributed Computing Systems, May 19-22, 2003.
Zupeng, et al., "Research of Peer-to-Peer Network Architecture," Proceedings of ICCT2003, pp. 312-315.

\* cited by examiner

METHOD FOR SPLITTING A LOAD OF MONITORING A PEER TO PEER NETWORK

RELATED APPLICATIONS

This application is a divisional of U.S. application Ser. No. 11/039,981, filed Jan. 21, 2005 now U.S. Pat. No. 8,095,614, which is a continuation-in-part of U.S. application Ser. No. 10/764,111, filed Jan. 23, 2004 now U.S. Pat. No. 7,761,569.

The entire teachings of the above applications are incorporated herein by reference.

FIELD OF THE INVENTION

The present invention provides a method for optimally utilizing peer to peer networks, and, in particular, to optimally utilize peer to peer networks to increase the amount of communications messages received.

BACKGROUND OF THE INVENTION

As used herein, peer to peer networks which are the subject of the present invention comprise multiple nodes, each node typically consisting both of file server and client which can send and receive communication messages or information to or from a node to which such is connected.

In a peer to peer network each node is connected to other nodes over a communication medium such as the internet either directly or through some type of proxy. For example, when a search request is issued such originating node sends a search request to all of the nodes to which it is connected (see FIG. 1) These nodes search their list of available files and if a match is found they send a response back with the location. However, a peer to peer proxy network typically consists of node A which is connected to a node B and node B is connected to a node C. (see FIG. 2) Node A is not connected to node C such that if node A issues a search request it will be forwarded to node B and Node B will search its available files and if a match is found it will send a response back to node A. Node B will then forward node A's request to node C and Node C will search its available files and if a match is found it will send a response back to node B. Node B will then forward this response to Node A. FIG. 3 discloses a nonproxy loop network wherein each node is directly connected to another.

Some peer to peer networks utilize a leaf node/main node proxy topology (See FIG. 4) where some nodes are classified as main nodes and the remaining nodes are classified as leaf nodes. Leaf nodes can only connect to main nodes. Only main nodes can connect to other main nodes. When a leaf node issues a search request it sends the request to the main node that it is connected to. The main node then forwards the request to any other leaf nodes that are connected to it and also to any main nodes it is connected to. These main nodes forward the request to any leaf nodes that are connected to them.

Accordingly it is an object of the present invention to provide a method for optimally utilizing a peer to peer network. It is yet another object of the invention to provide a method for reducing the number of connections required from a single node on a peer to peer network to view most, if not all, communication messages. It is yet another object of the invention to provide a method for optimally connecting to the network. It is yet another object of the invention to provide a method for locating nodes specific distances away from a first node.

SUMMARY OF THE INVENTION

Generally, the present invention provides a method for optimally utilizing a peer to peer network by controlling how a node connects into the network and by controlling how a node locates optimal nodes as well as by how the node interacts with the network and other nodes.

In one embodiment a first node issues a search for preselected information to help locate other nodes by watching responses. In another embodiment a first node issues a ping and compares the hops value to a predefined optimal value. In yet another embodiment a first node maintains connection statistics and compares these to a configured optimal value. In yet another embodiment a first node continuously clears its host cache at predetermined times.

In all of the embodiments, a node is configured to have one or more of the features set forth below. These features are employed in the invention to optimally utilize a peer to peer network as compared to the other network nodes on the particular network being addressed not so optimized. Thus, not all of the capabilities need to be programmed into each node in order to optimally utilize the network. The presently preferred methods of the present invention include:

configuring a node to send pings and review the distance parameters contained in the results.

configuring a node to send preconfigured searches and review the distance parameters contained in the results.

configuring a node to clear or modify its host cache based on a comparison of its host cache size.

configuring a node to clear or modify its host cache based on comparison of how long its host cache has existed.

configuring a node to throttle its connection attempts.

configuring a node to drop connections based on calculations of duplicate communication messages received.

configuring a node to drop connections based on the last time a transmission was received from a connection.

configuring a node to drop connections based on how well the connection is performing when compared to other connections.

configuring a node to connect to other similar nodes or a master node and share processing of the network.

Other advantages of the present invention will become apparent from a perusal of the following detailed description of presently preferred embodiments of the invention taken in connection with the accompanying drawings.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
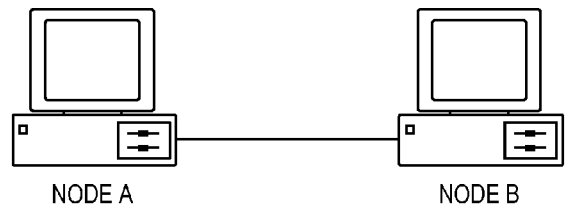
FIG. 1 is a simplified schematic of a two node peer to peer network.

A description of example embodiments of the invention follows.

Generally, peer to peer networks are quite large, often a million or more nodes. To reduce the bandwidth required to operate such networks, nodes have a community imposed transmission distance limitation. Most communication messages contain communication radius parameters such as hops. Hops is a value that normally starts at 0 and increments each time the communications is forwarded. When hops reaches a preset limit, often 5, the communications is dropped from the network. This effectively enforces a community "time to live" value and limits the number of nodes that would receive the communications from a particular transmitting node. It therefore would be optimal and advantageous to connect in such a way that a node would be within reach of all communication messages.

In one embodiment of the invention a first node wishing to be optimally connected to a second node issues a search request containing a preconfigured search term. This search term can be any term but preferably one that will match many files on other nodes. As other nodes available through the second node respond to the first node, the first node looks at the hops value of their responses and compares it to a value which value can be preconfigured by the operator. Such value can be generated by a mathematical calculation based on other values, or it can be in relation to other values. If the hop value is equal or greater than the compared value, the first node will attempt to connect to the node sending the response. If the hop value is less than the compared value the first node will not attempt to connect to the node sending the response. This method allows the first node to connect to node that are N hops away from currently connected nodes and expands its communications radius.

In another embodiment, the first node connects to a second node and issues a ping rather than a second request. As other nodes available through the second node respond to the first node, the first node looks at the hops value of their responses and compares it to a value which can be preconfigured by the operator. Such value can be generated by a mathematical calculation based on other values, or it can be in relation to other values as in the first embodiment. If the hop value is more or greater than the compared value, the first node will attempt to connect to the node sending the response. If the hop value is less than the compared value the first node will not attempt to connect to the node sending the response. This method allows the first node to connect to node that are N hops away from currently connected nodes and expands its communications radius.

In another embodiment a first node seeking to locate other nodes on the network for connection purposes issues a search request containing a preconfigured search term. This search term can be any term but preferably one that will match many files on other nodes. As other nodes available through the second node respond to the first node, the first node attempts to connect to them or adds them to a cache to be connected to later.

Figure 3:
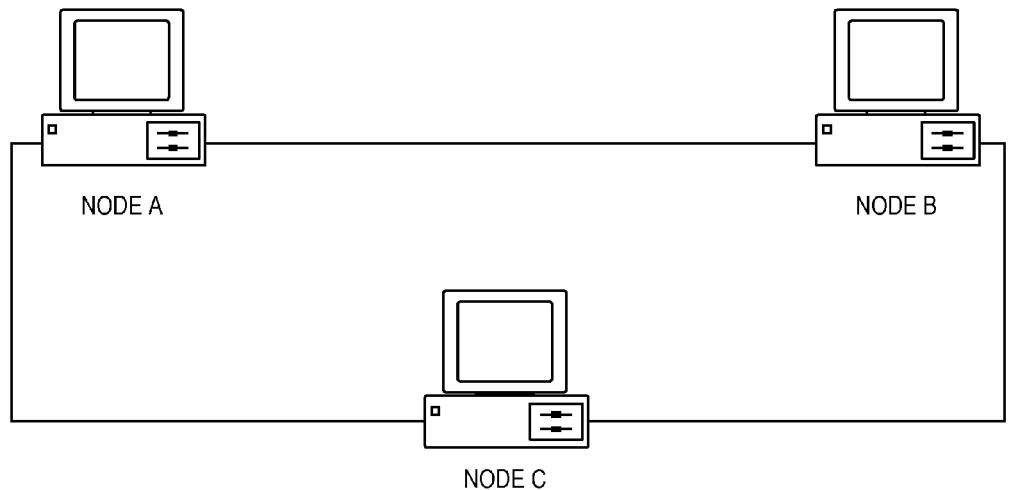
FIG. 3 is a simplified schematic view of a peer to peer, nonproxy, loop network.

Referring to FIG. 3, it is possible for a first node to be connected to other nodes which are within non-optimal distances from each other and these other nodes themselves having a second path to the first node. Other non-optimal connections are possible but the result of that is the first node would receive duplicate communications messages. It would benefit the first node if it could detect this situation, thus, in another embodiment of the invention, the first node maintains a count of duplicate communication messages which are received from each node. At intervals the first node will use the amount of duplicate communication messages in a preconfigured equation such as a comparison to a value, which value can be preconfigured by the operator, a value generated by a mathematical calculation based on other values or it can be in relation to other values. The comparison can be any comparison, for instance greater or less than or an average of. If using the equation, the node detects the connection is not optimal or meeting a certain criteria the first node will disconnect that connection.

It is possible for a first node to connect to a second node which is not connected to any other nodes or the second node may be configured to not forward any communications. In this situation the second node would be deemed unproductive. Thus, in another embodiment of the invention, the first node maintains a count of received communications messages for its connections. At intervals the first node will use the amount of received communication messages in a preconfigured equation such as a comparison to a value. This value can be preconfigured by the operator, it can be a value generated by a mathematical calculation based on other values or it can be in relation to other values. The comparison can be any comparison, for instance greater or less than or an average of. If using the equation, the node detects the connection is not optimal or meeting a certain criteria the first node will disconnect that connection.

In another embodiment the first node maintains a count of searches it has received from each connection. At intervals the first node will use these counts in a preconfigured equation such as a comparison to a value. This value can be preconfigured by the operator, it can be a value generated by a mathematical calculation based on other values or it can be in relation to other values. The comparison can be any comparison, for instance greater or less than or an average of. If using the equation, the node detects the connection is not optimal or meeting a certain criteria the first node will disconnect that connection.

In another embodiment the first node maintains the last time the node received a communication message on a specific connection. At intervals the first node will use the last transmission time in a preconfigured equation such as a comparison to a value, which value can be preconfigured by the operator, generated by a mathematical calculation based on other values or it can be in relation to other values. The comparison can be any comparison, for example greater or less than or an average of. If using the equation, the node detects the connection is not optimal or meeting a certain criteria the first node will disconnect that connection.

In some situations it may be preferable to drop connections that are not performing as well as the average of other connections or connections that are not performing within a certain percentage of the average of other connections or against a predefined performance range. Thus, in such a case, in another embodiment, the first node would keep specific communications statistics on its connections and at intervals calculate the average of these statistics and drop those connections that are below average or drop those connections that are below some percentage of the average.

Sometimes a node can get overloaded processing communications on peer to peer networks. In this situation it would be advantageous to be able to split the load of processing communications. Accordingly, in another embodiment of the invention, multiple nodes can connect to the network at different points and share the load. These multiple nodes would maintain communications paths between themselves or to a master node and transmit and receive information about what other network nodes and where each node is connected. This would allow multiple nodes to share the load. These nodes may also report back to a master node with the searches they are processing.

When connecting many times to a network, a load is placed on the resources of the node in relation to the number of connection attempts are occurring at one time. It would be a benefit to the node if it had some way to control or throttle multiple connection attempts to the network. In this embodiment of the invention, the node is configured for a set number of concurrent connection attempts. As connections are accepted, the node will add new connection attempts to maintain this set value. Without this method, a node wishing to connect to 1,000 other nodes would attempt 1,000 concurrent connections. With the method, and configured for a maximum number of 50 concurrent connections, the node would attempt 50 concurrent connection attempts to the network. As these connection attempts succeeded or failed the node would add enough new connection attempts to reach the set limit of 50. Once the limit of 1,000 connections are established the node would not attempt any further connections.

Although limiting and controlling the concurrent number of connection attempts by the node reduces load, it is sometimes desired to initially start with a large number of concurrent connection attempts and then limit the number to a set value. In another embodiment the node is configured to attempt only a set number of concurrent connection attempts. When the connection attempts first start, the node attempts as many connections as possible until the number of successful connections reaches some value. This value can be preconfigured by the operator, generated by a mathematical calculation based on other values, or it can be in relation to other values. Once this value is reached the node will reduce its attempts to the limited concurrent connection method described above.

In many cases, a first node may connect to a second node and after some time the second node may stop transmitting without the first node knowing of such occurrence. This second node may stop transmitting because of technical problems or it may stop transmitting because it is no longer being utilized. It would be a benefit to the first node to drop the connection just as a precaution after some time has past. In one embodiment the first node is configured to keep track of when it connected to a second node. After some configured or calculated time limit is reached, the first node drops the connection and attempts to connect to either the same node again or to a different node.

As nodes connect to the network they are constantly receiving address information about other nodes to which it can be potentially connected. As these new nodes are discovered they are added to a cache. This cache is used to provide the node with potential new connections. Some nodes have a set limit on the number of concurrent connections they can have. Should their set limit be reached they will not connect to any further nodes but they will continue to add any newly discovered nodes to their cache. Should a node maintain very long connections, nodes in this cache may become invalid for various reasons. When the node finally looses connections and attempts to connect to nodes in the cache, resources are consumed and wasted because the nodes are invalid. Thus, in yet another embodiment, the node is configured to add nodes to its cache as normal but also configured to clear the cache at set intervals or when the cache reaches a certain limit By constantly clearing the cache a reduction in invalid nodes is achieved.

EXAMPLES

The following Examples illustrate various embodiments of the methods according to the present Invention.

Example 1

Figure 5:
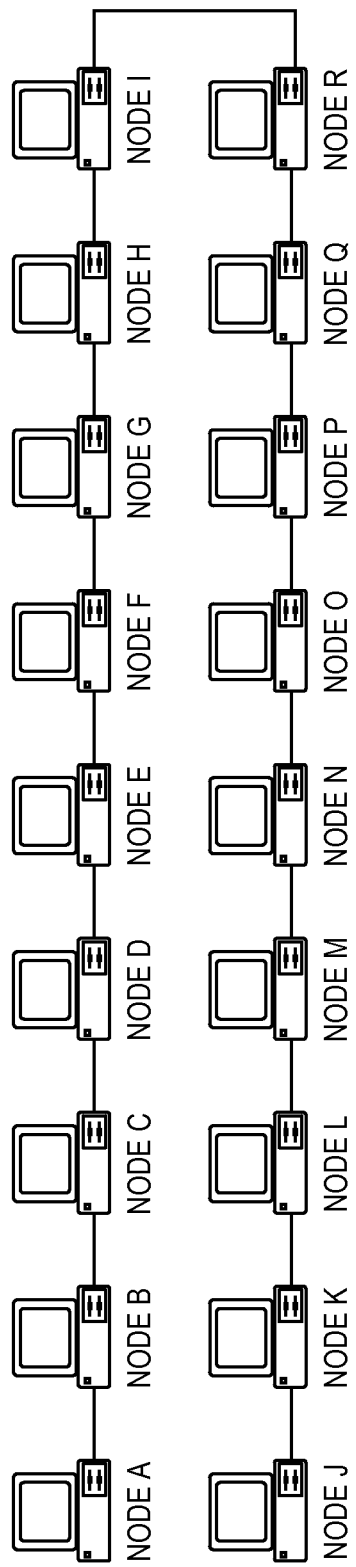
FIG. 5 is a simplified schematic of a peer to peer network consisting of more than 5 hops.

Referring to FIG. 5, this example illustrates a method for obtaining hop information from search requests and using this information to optimally connect to the network.

In this example node A is connected to node B and wishes to optimally connect into the rest of the network. The network is configured to allow communication messages to travel a maximum of 5 hops so node A is configured to look for nodes 5 hops away. Each node contains a file called "Samuel.txt." Node A sends out a search message to the network via node B with the term "Samuel.txt." Nodes A, B, C, D, E and F all respond. Node A reviews each search response and finds that node F is 5 hops away. Node A connects to node F. Node A sends out a search message to the network via node F with the term "Samuel.txt." Nodes B, C, D, E, F, G, H, I and R respond. Node A reviews each search response and finds that nodes B and R are 5 hops away. Node A knows that it is already connected to node B so it connects only to node R. Node A sends out a search message to the network via node R with the term "Samuel.txt." Nodes F, G, H, I, R, Q, P, 0 and N respond. Node A reviews each search response and finds that nodes F and N are 5 hops away. Node A knows that it is already connected to node F so it connects only to node N. Node A sends out a search message to the network via node N with the term "Samuel.txt." Nodes J, K, L, M, N, O, P, Q, and R respond. Node A reviews each search response and finds that nodes J and R are 5 hops away. Node A knows that it is already connected to node R so it connects only to node J. Node A sends out a search message to the network via node J with the term "Samuel.txt." Nodes J, K, L, M, and N respond. Node A reviews each search response and finds that node N is 5 hops away. Node A knows that it is already connected to node N so it does not connect. Node A is now within 5 hops of all nodes and will receive all communications from all nodes.

Example 2

Referring again to FIG. 5, example 2 illustrates a method for obtaining hop information from pings and using this information to optimally connect to the network In this example, node A is connected into node B and wishes to optimally connect into the rest of the network. The network is configured to allow communication messages to travel a maximum of 5 hops so node A is configured to look for nodes 5 hops away. Node A sends out a ping message to the network via node B. Nodes A, B, C, D, E and F all respond. Node A reviews each response and finds that node F is 5 hops away. Node A connects to node F. Node A sends out a ping to the network via node F. Nodes B, C, D, E, F, G, H, I and R respond. Node A reviews each response and finds that nodes B and R are 5 hops away. Node A knows that it is already connected to node B so it connects only to node R. Node A sends out a ping message to the network via node R. Nodes F, G, H, I, R, Q, P, 0 and N respond. Node A reviews each response and finds that nodes F and N are 5 hops away. Node A knows that it is already connected to node F so it connects only to node N. Node A sends out a ping message to the network via node N. Nodes J, K, L, M, N, 0, P, Q, and R respond. Node A reviews each response and finds that nodes J and R are 5 hops away. Node A knows that it is already connected to node R so it connects only to node J. Node A sends out a ping message to the network via node J. Nodes J, K, L, M, and N respond. Node A reviews each response and finds that node N is 5 hops away. Node A knows that it is already connected to node N so it does not connect. Node A is now within 5 hops of all nodes and will receive all communications from all nodes.

Example 3

Referring to FIG. 5, example 3 illustrates a method for locating other nodes so that more connection options exist.

In this example Node A wishes to find other nodes to connect to. Node A is already connected to node B. The network is configured to allow communication messages to travel a maximum of 5 hops. Each node contains a file called "Samuel.txt." Node A sends out a search message to the network via node B with the term "Samuel.txt." Nodes A, B, C, D, E and F all respond. Node A reviews each search response and uses the address information contain in the message to connect to these nodes.

Example 4

Figure 2:
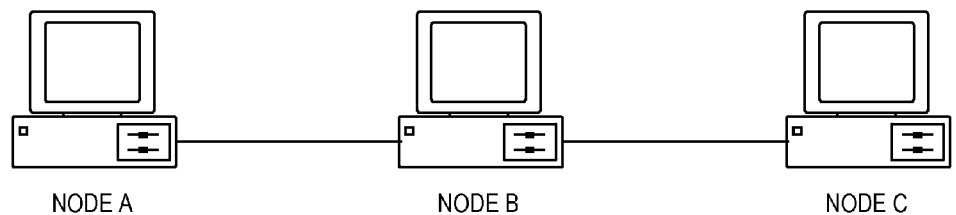
FIG. 2 is a simplified schematic of a peer to peer proxy network.

Referring to FIGS. 2 and 3, example 4 illustrates a method for optimizing a node's connections by looking at the number of duplicate messages that exist.

Referring to FIG. 3, B seeks to locate the file "Samuel.txt" and sends a search request out both of its connections to nodes A and C. Node C receives the search request. Node A receives the search request. Node A forwards the search request to node C. Node C records that it has received a duplicate message from node A. Node C finds that it has been configured to drop connections when it receives 1 duplicate message so it drops the connection to node A. Node C can still see searches from node A because they will travel through node B. Now referring to FIG. 2, the end result is that only one connection is needed to receive all communications from the network.

Example 5

Figure 4:
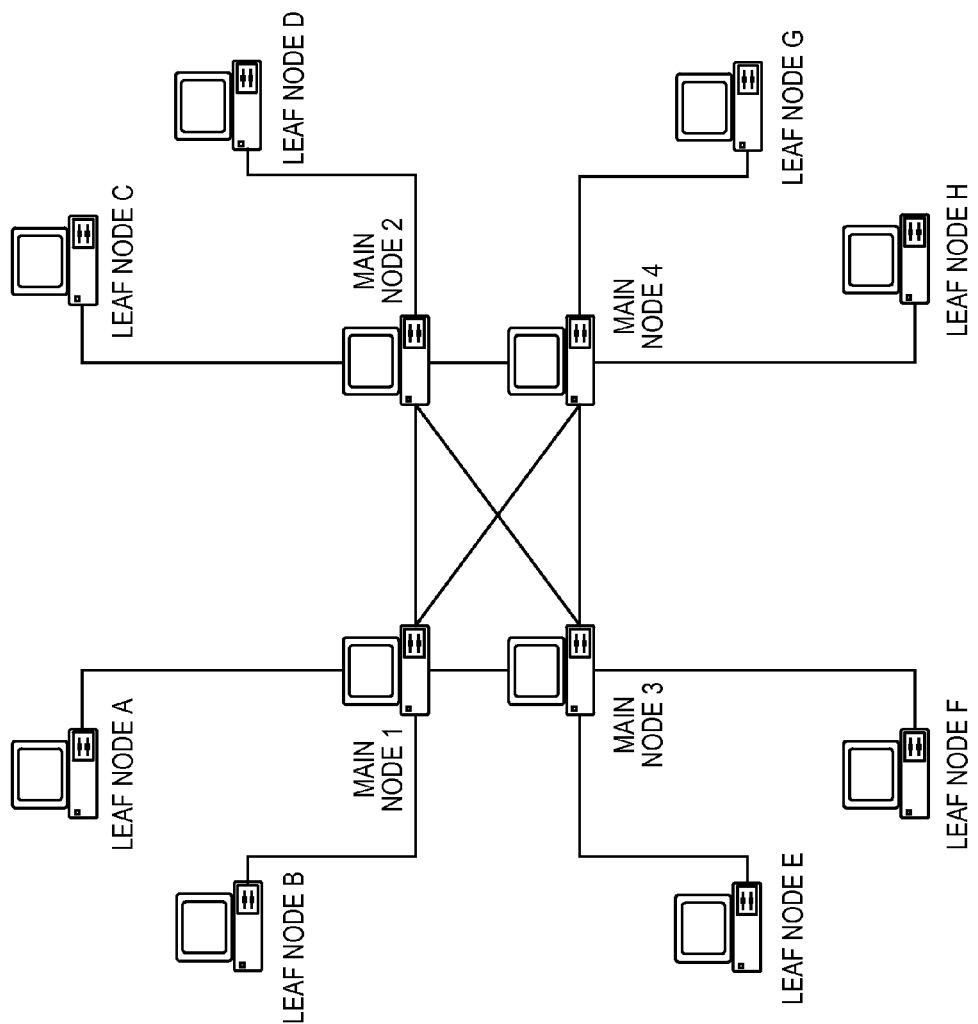
FIG. 4 is a simplified schematic of a peer to peer leaf/main node network.

Referring to FIG. 4, example 5 illustrates a method for optimizing a node's connections by monitoring the number of communication messages received on a connection.

In this example, main node 4 wishes to optimize its connections by monitoring how many communication messages it is receiving from all connections and comparing them to an average. If a connection does not meet the average it will disconnect the connection. Main node 4 records the following statistics:

Main node 2 has sent 1 communication message
Main node 3 has sent 1 communication message
Leaf node G has sent 1 communication message
Leaf node H has sent 1 communication message
Main node 4 then waits, for example, 5 minutes, and records the following statistics:
Main node 2 has sent 51 communication messages
Main node 3 has sent 53 communication messages
Leaf node G has sent 54 communication messages
Leaf node H has sent 1 communications message
Main node 4 adds the delta of all messages together and divides by 4 to get an average of 38.75. Because main node 4 is configured to drop any connections below the average, it will drop the connection to leaf node H.

Example 6

Referring again to FIG. 4, example 6, illustrates a method for optimizing a node's connections by monitoring the time of the last transmission received on a connection.

In this example, main node 4 is programmed to optimize its connections by monitoring when the last time its connections received a communication message and comparing them to a value. If a connection has not received any communication messages within 1 minute the node will drop the connection. Main node 4 records the following statistics:

Main node 2 has sent 1 communication message
Main node 3 has sent 1 communication message
Leaf node G has sent 1 communication message
Leaf node H has sent 1 communication message
Main node 4 then waits 1 minute and records the following statistics:
Main node 2 has sent 51 communication messages
Main node 3 has sent 53 communication messages
Leaf node G has sent 54 communication messages
Leaf node H has sent 1 communications message
Because main node 4 is configured to drop any connections that have not received any communication messages within 1 minute it will drop the connection to leaf node H.

Example 7

Referring to FIG. 4 again, example 7 illustrates a method for optimizing a node's connections by monitoring the number of search requests received on its connections.

In this example, main node 4 is programmed to optimize its connections by monitoring how many search requests it is receiving from all connections and comparing them to an average. If a connection does not meet the average it will disconnect the connection. Main node 4 records the following statistics:

Main node 2 has sent 1 search request
Main node 3 has sent 1 search request
Leaf node G has sent 1 search request
Leaf node H has sent 1 search request
Main node 4 then waits, 5 minutes and records the following statistics:
Main node 2 has sent 51 search request
Main node 3 has sent 53 search request
Leaf node G has sent 54 search request
Leaf node H has sent 1 search request
Main node 4 adds the delta of all messages together and divides by 4 to get an average of 38.75. Because main node 4 is configured to drop any connections below the average, it will drop the connection to leaf node H.

Example 8

Figure 6:
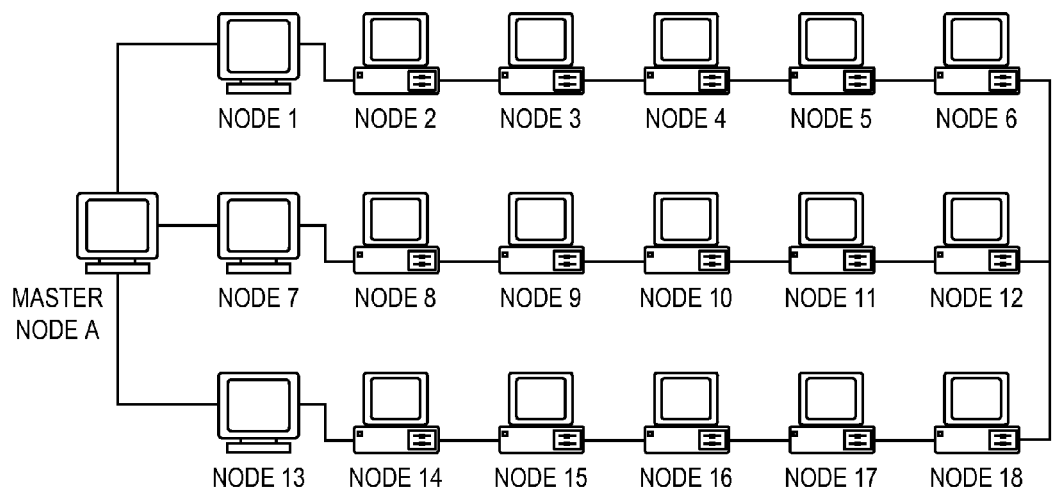
FIG. 6 is a simplified schematic of a peer to peer network with nodes sharing the load.

Referring to FIG. 6, example 8 illustrates a method for splitting the load among multiple nodes and reporting the information to a master node. The master node also keeps track of which network nodes the load sharing nodes are connected to.

Here, Nodes 1, 7 and 13 are depicted as sharing the load of monitoring a network at optimal points. Node 1 is connected to node 2 and reports this information to master node A. Node 7 is connected to node 8 and reports this information to master node A. Node 13 is connected to node 14 and reports this information to master node A. Node 7 wishes to connect to node 2 and sends this request to master node A. Master node A knows that node 1 is connected to node 2 and denies the request.

Node 2 issues a search request for "samuel.txt." Node 1 receives this communications message and forwards it to master node A. Master node A records the information. Node 17 issues a search request for "bob.txt." Node 13 receives this communication message and forwards it to master node A. Master node A records this information.

Example 9

Figure 7:
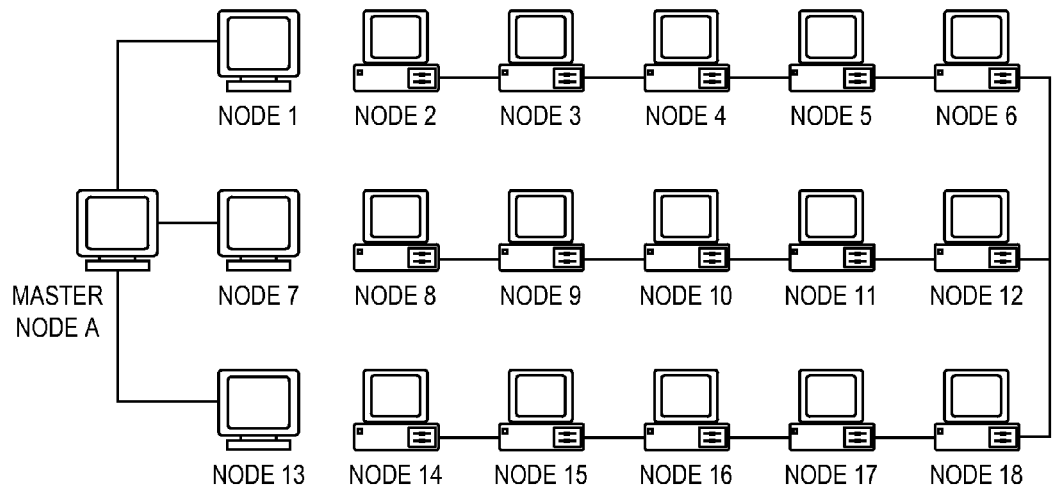
FIG. 7 is a simplified schematic of a peer to peer network with nodes sharing the load but not yet connected.

Referring to FIGS. 6 and 7, example 9 illustrates a method for splitting the load among multiple nodes and reporting the information to a master node. The master node also informs the load sharings nodes which network nodes to connect to.

Referring first to FIG. 7, in this example Nodes 1, 7 and 13 wish to join the network. Nodes 1, 7 and 13 send communication messages to master node A requesting clients to connect to. Master node A replies to node 1 with connection information for node 2. Master node A replies to node 7 with connection information for node 8. Master node A replies to node 13 with connection information for node 14.

Nodes 1, 7 and 13 connect and are sharing the load of monitoring a network at optimal points. Node 1 is connected to node 2 and reports this information to master node A. Node 7 is connected to node 8 and reports this information to master node a. Node 13 is connected to node 14 and reports this information to master node A. Node 7 wishes to connect to node 2 and sends this request to master node A. Master node A knows that node 1 is connected to node 2 and denies the request.

Node 2 issues a search request for "samuel.txt." Node 1 receives this communications message and forwards it to master node A. Master node A records the information. Node 17 issues a search request for "bob.txt." Node 13 receives this communication message and forwards it to master node A. Master node A records this information.

Example 10

Figure 8:
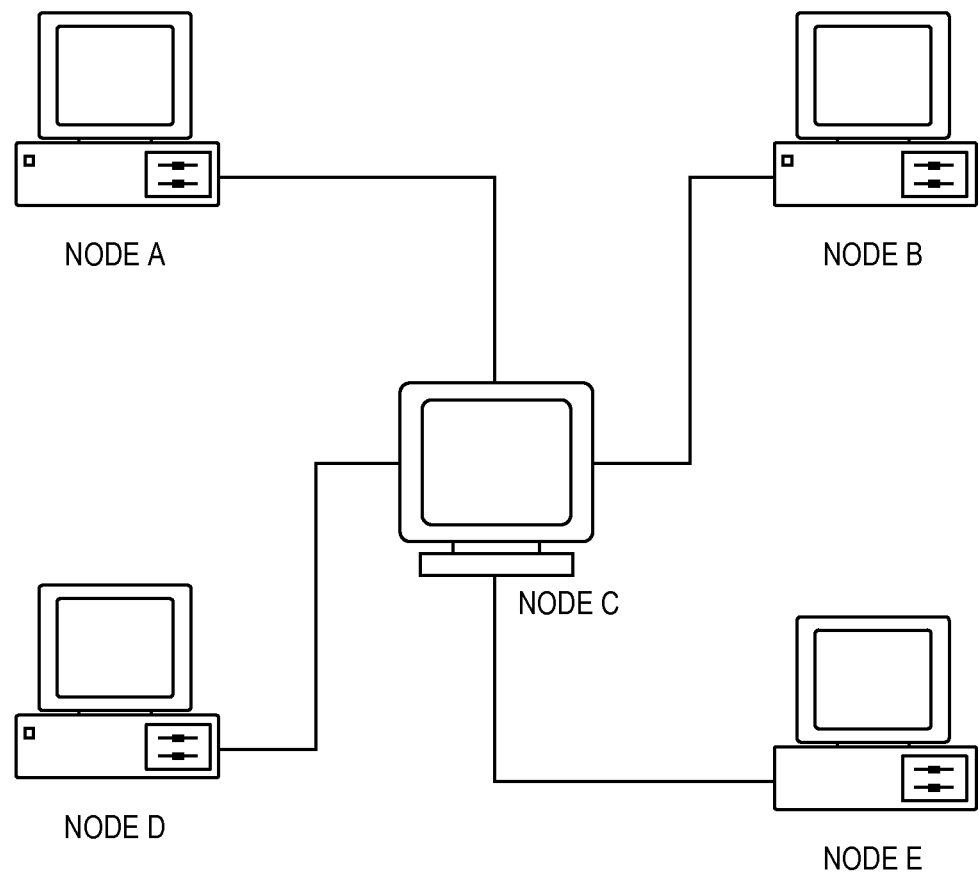
FIG. 8 is a simplified schematic of a peer to network with a node throttling its connections.

Referring to FIG. 8, example 10 illustrates a method for throttling connection attempts to a network.

In this example node C wishes to connect to a maximum of four other nodes. In its cache it has the following entries:
Node A
Node H
Node L
Node V
Node B
Node O
Node E
Node D Node C is configured to only have a maximum of 2 concurrent connection attempts and to wait 10 seconds for each connection attempt. Node C attempts to connect to node A and node H. Node C connects to node A and establishes a connection. Node C continues to wait for the connection attempt to node H. Because Node C connected to node A, there is now one empty connection slot so node C attempts to connect to Node V. The connection attempt to node H fails so there is now one empty connection slot. Node C attempts to connect to node B and this connection attempt succeeds. Because once again there is one empty connection slot node C attempts to connect to node O. An error occurs immediately and at the same time the connection attempt to node V fails as well. There are now two empty connection slots available.

Node C attempts to connect to node E and node D. Node C's connection attempt with node D is successful. After 10 seconds, the connection attempt to node E fails.

While presently preferred embodiments have been described and depicted, the invention may be otherwise embodied within the scope of the following claims:

While this invention has been particularly shown and described with references to example embodiments thereof, it will be understood by those skilled in the art that various changes in form and details may be made therein without departing from the scope of the invention encompassed by the appended claims.

What is claimed is:

1. A method for splitting a load of monitoring a peer to peer network, the method comprising:
   at a first node in the peer to peer network having a plurality of nodes where each node is a computing device configured to transmit and/or receive messages over the peer to peer network, the first node configured for:
   (a) issuing a request to a master node to connect to a particular node in the peer to peer network, where the master node receives information reported by a second node in the peer to peer network indicating which nodes in the peer to peer network are connected to the second node;
   (b) receiving a denial to the request issued to the master node to connect to the particular node, based on the master node determining that the received information indicates that the particular node is one of the nodes in the peer to peer network connected to the second node;
   (c) if no such denial is received, connecting to the particular node based on the master node determining that the received information indicates that the particular node is not one of the nodes in the peer to peer network connected to the second node; and
   (d) reporting information to the master node including information concerning which nodes are connected to the first node, thereby splitting the load of monitoring the peer to peer network among the first and second nodes such that the first node is not connected to any of the same nodes to which the second node is connected to and such that the second node is not connected to any of the same nodes to which the first node is connected to.

2. The method of claim 1 wherein the information reported by the second node includes search requests received by the second node.

3. The method of claim 1
   wherein the second node reports the information directly to the master node.

4. The method of claim 1 wherein connecting to the particular node, based on the received information indicating that the particular node is not one of the nodes in the peer to peer network connected to the second node, includes requesting the master node return connection information for the particular node, the master node returning the connection information to the first node.

5. The method of claim 1 wherein reporting the information includes reporting the information directly to the master node; and
   wherein the second node issues requests to the master node to connect to other nodes and the master node utilizes the reported information to either deny or allow the requests issued by the second node.

6. The method of claim 1 further comprising storing, in a cache, one or more nodes to connect to, which are different from the nodes in the peer to peer network connected to the second node.

7. The method of claim 6 further comprising clearing the cache.

8. A computing node comprising:
  processing logic configured to:
    receive and/or transmit messages over a peer-to-peer network,
    receive information reported by a different computing node in the peer-to-peer network, wherein the information indicates which computing nodes the different computing node is connected to,
    not connect to the particular node based on the received information indicating that the particular node is one of the computing nodes connected to the different computing node,
    connect to a particular node based on the received information indicating that the particular node is not one of the computing nodes connected to the different computing node, and
    report information to the different computing node, that includes information indicating other computing nodes the computing node is connected to, such that the different computing node in the peer-to-peer network has access to the reported information and does not connect to the other computing nodes the computing node is connected to, thereby splitting the load of monitoring the peer-to-peer network among the computing node and the different computing node.

9. The computing node of claim 8 wherein the information reported by the different computing node includes search requests received by the different computing node.

10. The computing node of claim 8 wherein the computing node receives the information from a master computing node in the peer-to-peer network that receives the information from the different computing node.

11. The computing node of claim 8 wherein the processing logic is further configured to request a master computing node to provide the information that indicates which computing nodes the different computing node is connected to.

12. The computing node of claim 11 wherein the processing logic is further configured to transmit the reported information to the master computing node, thereby allowing the different computing node to obtain the reported information from the master computing node.

13. The computing node of claim 8 further comprising a cache configured to store the information indicating which computing nodes the different computing node is connected to.

14. A method comprising:
  reporting, by each load sharing node to other load sharing nodes in the peer to peer network, information indicating which nodes each load sharing node is connected to in the peer to peer network, each node in the peer to peer network including a computing device configured to transmit and/or receive messages over the peer to peer network;
  in response to a first load sharing node determining that no other load sharing node is connected to a particular node in the peer to peer network based on the information reported to the first load sharing node by the other load sharing nodes, connecting the first load sharing node to the particular node and reporting new information to the other load sharing nodes indicating that the first load sharing node is now connected to the particular node; and
  in response to the first load sharing node determining that one of the other load sharing nodes is connected to the particular node based on the information reported by the other load sharing nodes, suppressing connections from the first load sharing node to the particular node, such that no two load sharing nodes are connected to the same nodes.

15. The method of claim 14 wherein each load sharing node reports the information to a master node that is not the first load sharing node.

16. The method of claim 15 wherein the new information is reported to the master node.

17. The method of claim 15 wherein the master node denies a request made by the first load sharing node to connect to the particular node in response to determining that one of the other load sharing nodes is connected to the particular node.

18. The method of claim 16 wherein the other load sharing node receives the new information reported by the first load sharing node from the master node.

* * * * *